United States Patent
Manssen et al.

[19]

[11] Patent Number: 5,963,876
[45] Date of Patent: Oct. 5, 1999

[54] METHOD FOR EDITING A RECEIVED PHONE NUMBER PRIOR TO PLACING A CALL TO THE RECEIVED PHONE NUMBER

[75] Inventors: Keith Ronald Manssen, Long Grove; Kevin D. Kaschke, Hoffman Estates, both of Ill.

[73] Assignee: Motorola, Inc., Schaumburg, Ill.

[21] Appl. No.: 08/753,231

[22] Filed: Nov. 22, 1996

[51] Int. Cl.$^6$ .................................................. H04Q 7/32
[52] U.S. Cl. .................................... 455/564; 379/355
[58] Field of Search .................................... 455/460, 564, 455/566; 379/354, 355

[56] References Cited

U.S. PATENT DOCUMENTS

| | | | |
|---|---|---|---|
| Re. 33,417 | 10/1990 | Bhagat et al. | 455/460 |
| 4,072,824 | 2/1978 | Phillips | 379/70 |
| 4,263,480 | 4/1981 | Levine | 455/31.2 |
| 4,336,524 | 6/1982 | Levine | 340/311.1 |
| 4,490,579 | 12/1984 | Godoshian | 340/825.44 |
| 4,661,972 | 4/1987 | Kai | 455/31.2 |
| 5,422,938 | 6/1995 | Yamanishi | 379/142 |
| 5,559,862 | 9/1996 | Bhagat et al. | 455/460 |
| 5,722,088 | 2/1998 | Storn et al. | 455/564 |

FOREIGN PATENT DOCUMENTS

| | | |
|---|---|---|
| 2162404A | 1/1986 | United Kingdom. |
| 2252015A | 7/1992 | United Kingdom. |
| 2282732A | 4/1995 | United Kingdom. |
| 2284520A | 6/1995 | United Kingdom. |
| WO 92/03882 | 3/1992 | WIPO. |
| WO 95/01693 | 1/1995 | WIPO. |

OTHER PUBLICATIONS

Ericsson Analog Portable Cellular Telephone User's Manual, First Edition, Sep. 1996. Ericsson Inc., pgs. Table of Contents i–iii, and 21.

*Primary Examiner*—Andrew M. Dolinar
*Attorney, Agent, or Firm*—Kevin D. Kaschke; Sylvia Y. Chen

[57] ABSTRACT

Prior to placing a call, a receiver (24) in a radio (10) receives a phone number transmitted by a calling party to produce a received phone number (38). The received phone number (38) is stored in a memory unit (16) of the radio (10). Numeric digits forming a prefix number (40) are inserted before the received phone number (38) in the memory unit (16) responsive to a number of digits in the received phone number (38) to produce an edited phone number (39). A transmitter (20) in the radio (10) transmits the edited phone number (39) to place the call to the received phone number (38). This method for editing a received phone number (38) prior to placing a call to the received phone number (38) advantageously simplifies the dialing process when placing the call to the received phone number (38).

11 Claims, 4 Drawing Sheets

METHOD FOR EDITING A RECEIVED PHONE NUMBER PRIOR TO PLACING A CALL TO THE RECEIVED PHONE NUMBER

FIELD OF THE INVENTION

The present invention relates generally to a method for placing calls, and more particularly to a method for editing a received phone number prior to placing a call to the received phone number.

BACKGROUND OF THE INVENTION

Communication devices such as radios including radiotelephones and pagers are well known in the art. Communication devices of this type provide users of the devices with wireless communications by transmitting and/or receiving signals.

Pagers provide a user with notification and a phone number of a persons who is trying to contact the user of the pager. The phone number of the calling party is typically entered by the calling party and transmitted to the pager by a paging system. Once the phone number of the calling party is received by the pager, the phone number is typically stored in memory of the pager and/or shown in a display on the pager. The user usually recalls the phone number from memory and/or views the phone number on the display to determine the phone number of the calling party. The user calls the calling party back at the phone number by using a telephone device, via a cellular or a landline connection for example. In this scenario the user can conveniently view the received phone number in the pager display while dialing the phone number using the telephone device.

Radiotelephones provide a user with notification that a party has called when the user is not available to answer the radiotelephone. The phone number of the calling party is typically entered by the calling party and transmitted to the radiotelephone by a radiotelephone system. Once the phone number of the calling party is received by the radiotelephone, the phone number is typically stored in memory of the radiotelephone and/or shown in a display on the radiotelephone. The user usually recalls the phone number from memory and/or views the phone number on the display to determine the phone number of the calling party.

A radiotelephone and a pager together in a single portable combination unit is known in the art. In such a combination unit or in a radiotelephone alone, the user reads and uses the phone number received from the calling party and stored in memory to return the call to the calling party the phone number received.

However, one disadvantage of using the phone number received from the calling party and stored in memory is that the number of digits in the phone number provided by the calling party varies. The user may need to enter ten, seven, five or four digit phone number, for example, depending on how familiar the calling party thinks the user of the communication device is with the phone number received. The user needs to enter the appropriate digits ahead of the phone number received as well as reenter the phone number received to produce a complete phone number. This causes user of the communication device to dial the complete phone number needed to place the return call.

Another disadvantage of using the phone number received from the calling party and stored in memory is that the calling party and the user of the communication device may not be in the same telephone area. Typically, the calling party does not know the location of the user of the communication device. The user may need to enter the appropriate long distance area code and the local area code ahead of the phone number received as well as reenter the phone number received. In this situation the user of the communication device also needs to dial the complete long distance phone number to place the return call.

Another disadvantage of using the phone number received from the calling party and stored in memory is that the communication device typically only has one display. Therefore, the user must clear or store the received phone number and remember the received phone number to reenter it in the display while placing a return call to the received phone number. The steps of remembering the appropriate digits to enter ahead of the received phone number as well as recalling and manually reentering the digits of the phone number received is unnecessarily taxing on the user of the communication device.

Because of the varying number of digits the calling party may enter, the unknown location of the user of the device to the calling party, and the use of only one display in the communication unit it is cumbersome for a user of the communication device to easily use the phone number received from the calling party and stored in memory to place the return call to the phone number received. Accordingly, there is a need for a method for editing a received phone number prior to placing a call to the received phone number which is easy to use and enables the user to enter fewer keystrokes to place the call to the received phone number.

DETAILED DESCRIPTION OF A PREFERRED EMBODIMENT

Figure 1:
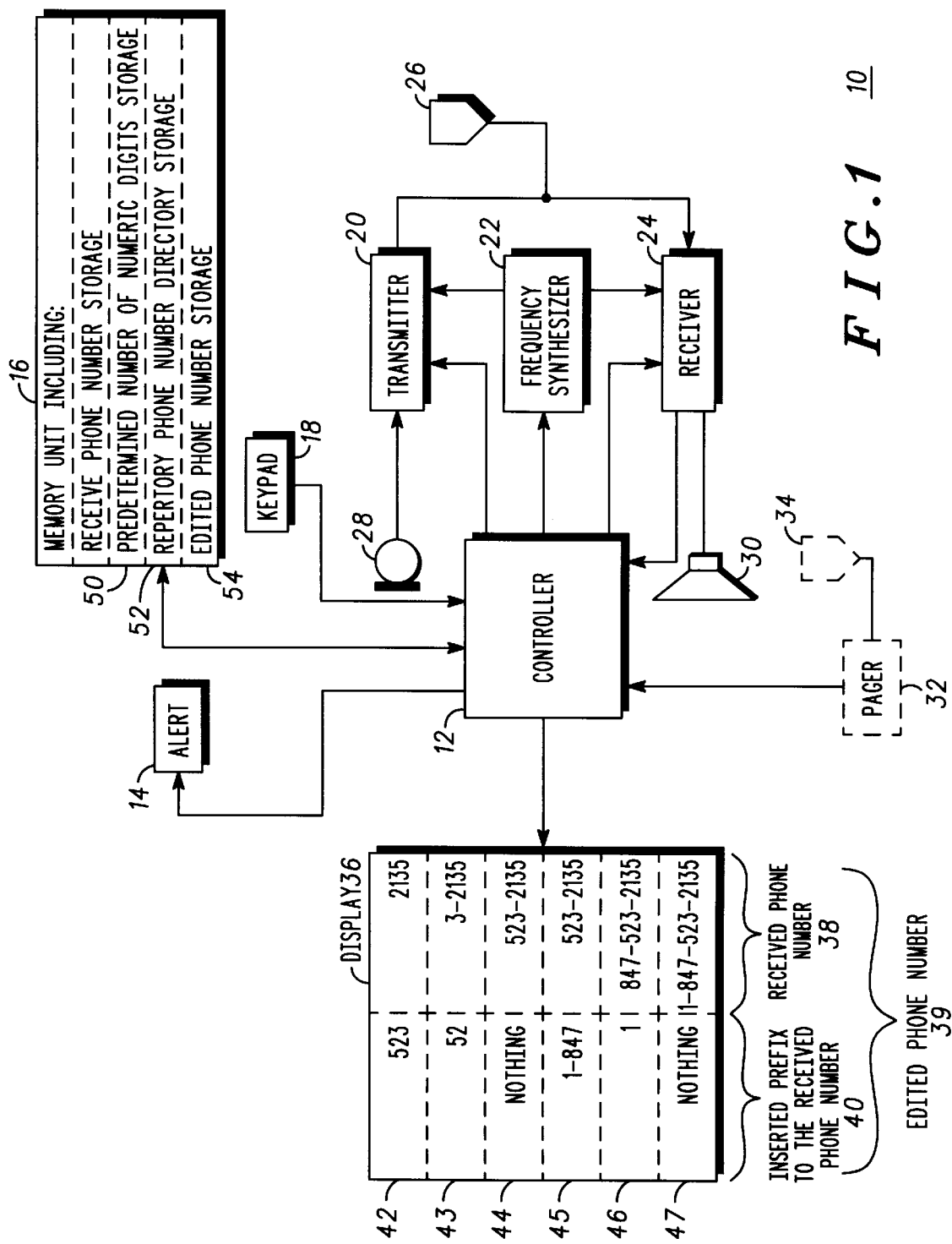
FIG. 1 is a block diagram of a communication device incorporating a method described in a flow chart of FIG. 2.
Figure 2:
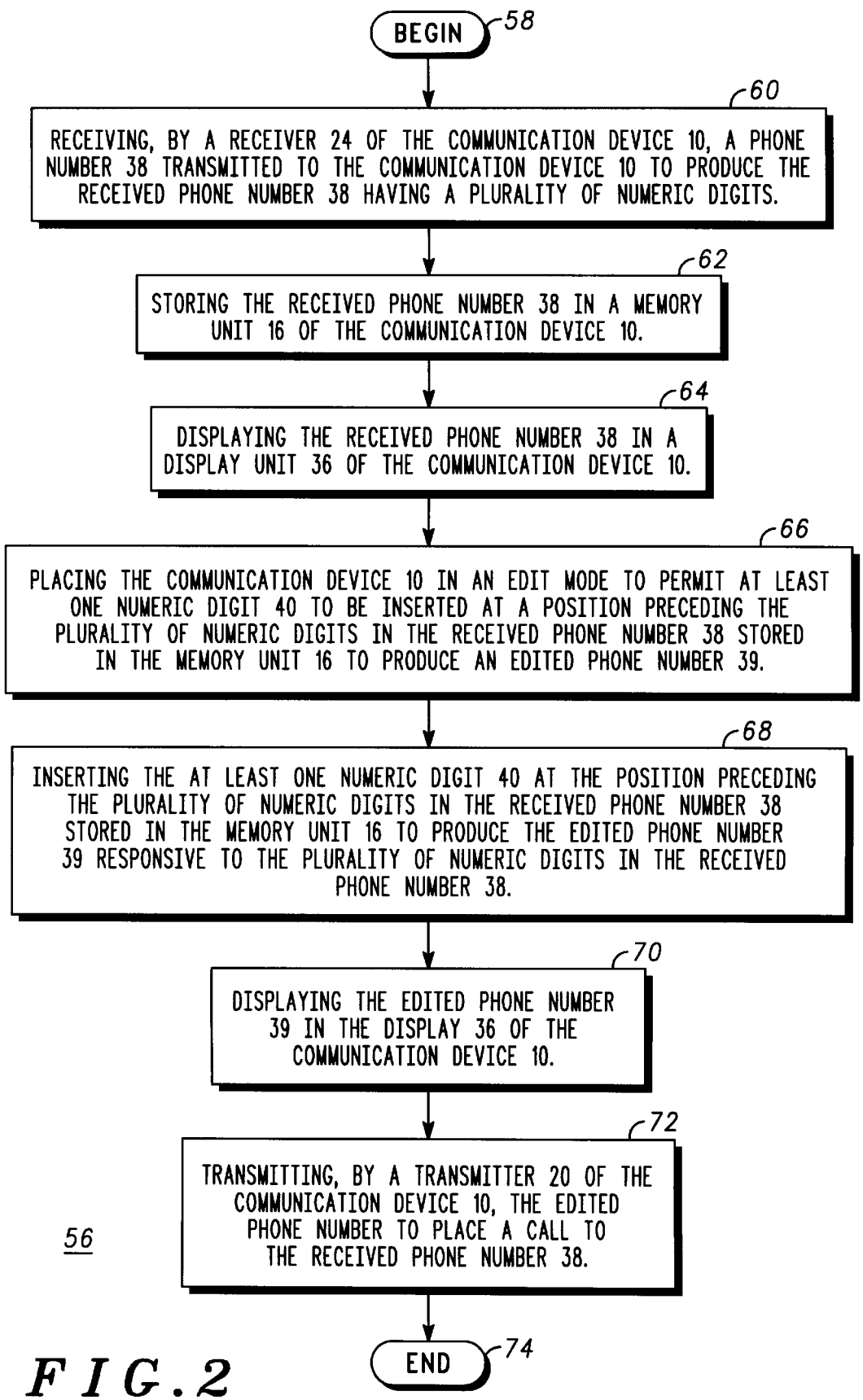
FIG. 2 is a flow chart, implemented in the block diagram of the communication device of FIG. 1, describing steps of a method for editing a received phone number prior to placing a call to the received phone number.

FIG. 1 is a block diagram of a communication device 10 incorporating a method described in a flow chart of FIG. 2. The communication device 10 generally comprises a controller 12, an alert 14, a memory unit 16, a keypad 18, a transmitter 20, a frequency synthesizer 22, a receiver 24, an antenna 26, a microphone 28, a speaker 30, an optional pager 32 with an optional antenna, and a display 36. The general operation of the blocks of the communication device 10 for operation as a radiotelephone, pager or combination radiotelephone/pager unit is well known in the art. The keypad generally includes individual keys zero through nine, *, #, a "send" key, an "end" key, a "function" key, and a "power" key. Preferably, the communication device 10 is a combination radiotelephone/pager unit. In a radiotelephone/pager unit, the paging function and the radiotelephone receiving function can operate on different frequency bands or on the same frequency band. When different frequency bands are used the optional pager 32 and optional antenna 34 receive page signals in one frequency band and the receiver 24 and the antenna 26 receive radiotelephone signals in another, different frequency band. When the same frequency band is used the receiver 24 and the antenna 26 receive both page signals and radiotelephone signals in the same frequency band. The present invention is advantageously utilized in any type of radio communication device that has the ability to receive and transmit signals. Devices envisioned for use with the present invention include: a radiotelephone, a two-way pager, and a combination radiotelephone/pager unit, to name a few by example. The present invention employs a method, embodied within the controller 12 and/or memory unit 16, for editing a received phone number 38 prior to placing a call to the received phone number 38.

FIG. 2 is a flow chart 56, implemented in the block diagram of the communication device 10 of FIG. 1, describing steps of a method for editing a received phone number 38 prior to placing a call to the received phone number 38. The method begins at step 58. The method continues at step 60 by the receiver 24 of the communication device 10 receiving a phone number transmitted to the communication device 10 by a calling party to produce the received phone number 38 having a plurality of numeric digits. The received phone number 38 will have a varying number of digits depending on the number of digits entered by the calling party. Presently, neither the user of the communication device nor the communication device has any control over the number of digits entered by the calling party. Further, the communication system in which the communication device operates does not require the user to enter a specific number of digits representing the received phone number 38. Several examples of the varying number of digits which the received phone number 38 may have are shown in FIG. 1 in the display 36 at reference numbers 42–46. At any one time the display 36 would typically show only one received phone number 38.

The method continues at step 62 by the controller 12 causing the received phone number 38 to be stored in the memory unit 16, which is preferably conventional random access memory (RAM). The received phone number 38 is stored so that it can be recalled for later use to place a call to the received phone number 38. Typically, the calling party is waiting for a return call at a telephone device having the received phone number 38 assigned thereto. However, the calling party may enter a received phone number 38 assigned to a telephone device at a different location than where the calling party is located.

The method continues at step 64 by the controller 12 causing the received phone number 38 to display the received phone number in the display 36. The display preferably has the capability to display fourteen digits at one time to provide for international phone numbers.

The method continues at step 66 by the communication device 10 being placed in an edit mode to permit the at least one numeric digit 40 to be inserted at a position preceding the plurality of numeric digits in the received phone number 38 stored in the memory unit 16 to produce an edited phone number 39. Preferably, the edit mode is activated by the user pressing keys on the keypad 18. The edit mode is preferably used to prompt the communication device 10 that the steps following the prompt are for inserting the prefix numbers 40 ahead of the received phone number 38 instead of some other function. Alternatively, the communication device 10 may be programmed to be automatically placed in an edit mode upon detecting by the controller 12 that a phone number 38 has been received by the receiver 24 or pager 32.

The method continues at step 68 by inserting at least one numeric digit 40 at a position preceding the plurality of numeric digits in the received phone number 38 stored in the memory unit 16 responsive to a number of the plurality of numeric digits in the received phone number 38 to produce the edited phone number 39. An advantage of inserting the prefix digits 40 is that the user does not have to remember and reenter the digits of the received phone number 38 already stored in the memory unit 16. The present invention presents several methods for implementing the step of inserting 68.

In the preferred embodiment, the step of inserting 68 is performed by the step of manually entering, by a user of the communication device 10, at least one numeric digit 40 at the position preceding the plurality of numeric digits in the received phone number 38 stored in the memory unit 16 to produce the edited phone number 39. When the communication device 10 is in the edit mode, a cursor in the display 36 is positioned at a digit position immediately ahead of the most significant digit shown in the received phone number 38. The user manually enters the digits at the cursor using the keypad 18. If more than one digit needs to be entered, additional digits are entered to the right of the last digit entered between the last digit entered and the most significant digit shown in the received phone number. Therefore, the user is permitted to manually enter the additional required prefix digits from left to right in a convenient mental recall and insert fashion. For example, in display example 42, the received phone number is "2135". The cursor is positioned immediately left of the digit "2". The user first enters a prefix digit "5" which shows up next to the digit "2" of the received phone number 38. The user next enters the prefix digit "2" which shows up between the prefix digit "5" and the digit "2" of the received phone number 38. The user finally enters the prefix digit "3" which shows up between the prefix digit "2" and the digit "2" of the received phone number 38.

Figure 3:
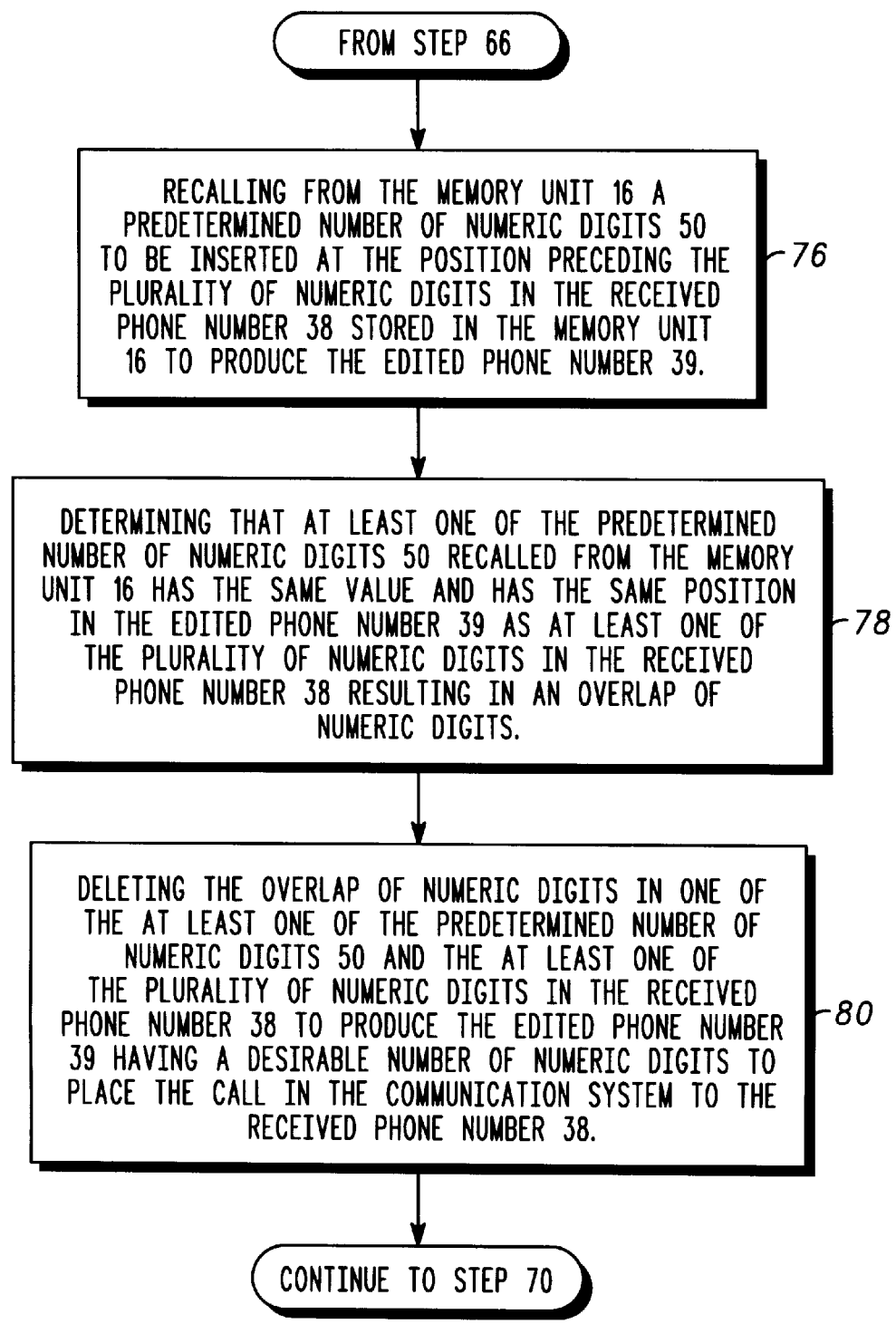
FIG. 3 is a flow chart describing further details of the step of inserting digits in a position preceding the received phone number as shown in FIG. 2 according to a first alternative.

FIG. 3 is a flow chart describing further details of the step of inserting digits in a position preceding the received phone number as shown in FIG. 2 according to a first alternative. In FIG. 3, the step of inserting 68 may be performed by the step 76 of recalling from the memory unit 16 a predetermined number of numeric digits 50 to be inserted at the position preceding the plurality of numeric digits in the received phone number 38 stored in the memory unit 16 to produce the edited phone number 40. For example, as shown in display example 45 the phone number received is "523-2135". The user recalls from the memory unit 16 the predetermined number of digits 50 as "1-847" representing the additional numbers necessary to dial a long distance call. Such number sequence would be a typical and frequently used sequence of the predetermined number of numeric digits 50. However, when the received phone number 38 includes a partial local area code, as in display example 43, the user would typically recall the predetermined number of numeric digits 50 as "523". Storing the entire local area code number would relieve the user from storing every partial local area code such as the predetermined number of numeric digits 50 as "5", "52" and "523". In the case of display example 43 when the user recalls the digits "523" representing the prefix digits 40 the digit "3" of the recalled predetermined number of numeric digits 50 and the digit "3" of the recalled phone number 38 have the same value and have the same position in the edited phone number. In other words, the digit "3" may be called a redundant digit or may be called an overlap digit. To remedy this situation for the user, the step of inserting 68 would include the step 78 of determining that at least one of the predetermined number of numeric digits 50 recalled from the memory unit 16 has the same value and has the same position in the edited phone number 39 as at least one of the plurality of numeric digits in the received phone number 38 resulting in an overlap of numeric digits. The overlap of numeric digits in one of the at least one of the predetermined number of numeric digits 50 and the at least one of the plurality of numeric digits in the received phone number 38 is deleted at step 80 to produce the edited phone number 39 having a desirable number of numeric digits to place the call in the communication system to the received phone number 38. The step of deleting is also characterized as the step of ignoring, eliminating, canceling, merging, or overwriting, etc. the redundant or overlapped digits. All of these optionally characterized steps are considered to have essentially the same effect of providing the proper number and sequence of numeric digits for the communication device 10 to place the call in the communication system to the received phone number 38. The step 80 of deleting is preferably performed automatically by the communication device 10. The controller 12 automatically compares the recalled digits with the received phone number and adjusts the edited phone number for any overlap of digits. Alternatively, the step of deleting may be performed manually by a user of the communication device 10.

Figure 4:
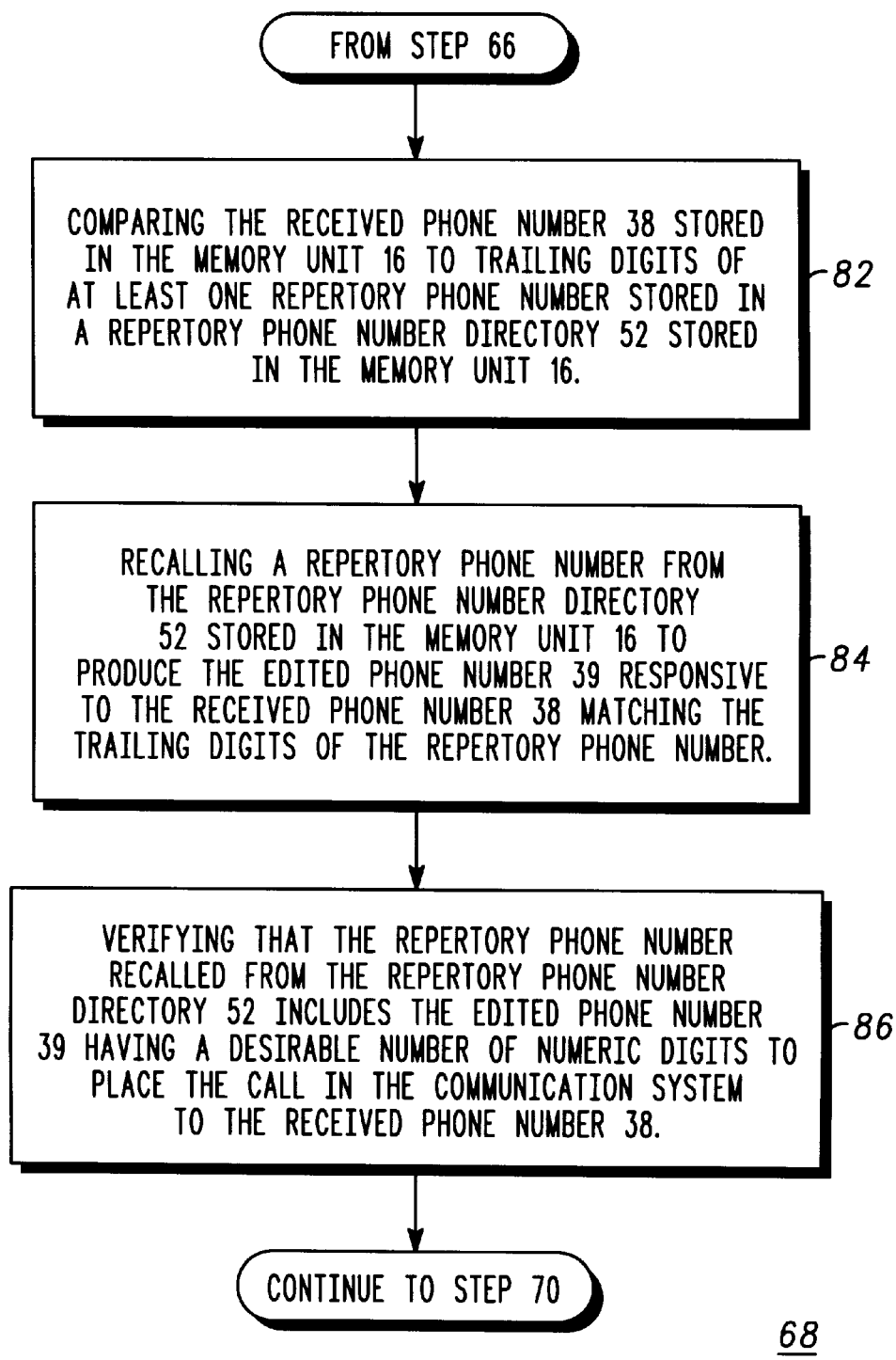
FIG. 4 is a flow chart describing further details of the step of inserting digits in a position preceding the received phone number as shown in FIG. 2 according to a second alternative.

FIG. 4 is a flow chart describing further details of the step of inserting digits in a position preceding the received phone number as shown in FIG. 2 according to a second alternative. In FIG. 4, the step of inserting 68 may be performed by the step 82 of comparing the received phone number 38 stored in the memory unit 16 to trailing digits of at least one repertory phone number stored in a repertory phone number directory 52 stored in the memory unit 16. Responsive to the received phone number 38 matching the trailing digits of a repertory phone number, the repertory phone number is recalled at step 84 from the repertory phone number directory 52 stored in the memory unit 16 to produce the edited phone number 39. For example, in display example 43, the received phone number 38 is "3-2135". These five numbers are compared against each phone number stored in the repertory phone number directory 52 until a match is made. If no match is made the communication device 10 can notify the user via a message in the display 36 or a tone via the alert 14, for example. If a match is made the repertory phone number, corresponding to the memory location where the match was detected, is copied into the edited phone number storage location 54 in the memory unit 16. The edited phone number 39 in the edited phone number storage location 54 in the memory unit 16 is now ready to transmit. The user also has the option of verifying at step 86 that the repertory phone number recalled from the repertory phone number directory 52 includes the edited phone number 54 having a desirable number and sequence of numeric digits to place the call in the communication system to the received phone number 38. The verification is preferably performed by the user reading the recalled phone number in the display 36. If the user determines that the recalled phone number is not the correct one and happens to coincide with another repertory phone number, the user simply hits a button on the keypad 18 to permit the search to continue until another match is found.

Note that the various steps of inserting 68 (manual, automatic, the steps of FIG. 3 and the steps of FIG. 4) can be used alone or in any combination to give the user maximum flexibility. For example, the user can choose to have the received phone number 38 be automatically compared with the phone numbers in repertory directory 52. If no match is found, the user can recall a predetermined number of digits 50 stored in the memory unit 16. If the predetermined number of digits 50 recalled includes too many digits in consideration of the number of digits in the received phone number 38, the user can manually edit the phone number to have the proper number of digits and sequence to make a call in the communication system. Further, the user can store this edited phone number in the memory unit 16 so that an automatic comparison will provide a match the next time the same phone number is received.

Further note that the communication device 10 may be programmed to provide maximum automation to minimize the number of keystrokes and/or mental operations by the user of the communication device 10. For example, the controller 12 is programmed to automatically enter the edit mode upon receiving the received phone number 38. The controller 12 then automatically compares the received phone number 38 with the phone numbers in repertory directory 52. Upon making a successful comparison, the recalled repertory phone number and the received phone number 38 are alternately displayed in the display 36 for two seconds each, for example. A marker, for example, is used to help the user distinguish the two phone numbers. Upon verification by the user, the user simply needs to push the "send" key on the keypad to place the call to the received phone number. Therefore, in this situation, the present invention advantageously reduces the number of keystrokes by the user corresponding to the number of digits needed to place the call (for example, 7 keystrokes in display example 42) to a single keystroke and merely a mental number verification process to place the call.

Also note that in some communication systems extra prefix digits 40 transmitted from the communication device 10 does not confuse the communication system or interfere with proper placement of the call. In this case, a user may recall a stock predetermined number of digits 50 "1-847-523", for example. Any overlapping digits between the predetermined number of digits 50 and the received phone number are automatically accounted for and the resulting full long distance phone number can be transmitted without a problem, even if the communication device 10 and the destination of the received phone number are in the same local area.

The method continues at step 70 by the displaying the edited phone number 39 in the display 36. This step permits the user to check the accuracy of the edited phone number 39 prior to placing the call to the received phone number.

The method continues at step 72 by the transmitting the edited phone number 39 to return the call to the calling party. Alternatively, the edited phone number 39 may be stored in the memory unit 16, such as the repertory phone number directory 52, for later use to make a call. The method ends at step 74 wherein the communication device 10 continues to perform other functions.

What is claimed is:

1. A method for editing a received phone number within a communication device prior to placing a call to the received phone number, the method comprising the steps of:

receiving a phone number transmitted to the communication device to produce the received phone number having a plurality of numeric digits;

storing the received phone number in a memory unit;

recalling from the memory unit a predetermined number of numeric digits to be inserted at the position preceding the plurality of numeric digits in the received phone number stored in the memory unit to produce an edited phone number;

determining that at least one of the predetermined number of numeric digits recalled from the memory unit has the same value and has the same position in the edited phone number as at least one of the plurality of numeric digits in the received phone number resulting in an overlap of numeric digits; and deleting the overlap of numeric digits in one of the at least one of the predetermined number of numeric digits and the at least one of the plurality of numeric digits in the received phone number to produce the edited phone number having a desirable number of numeric digits to place the call in the communication system to the received phone number.

2. A method according to claim 1 further comprising the step of:

placing the communication device in an edit mode to permit the at least one numeric digit to be inserted at the position preceding the plurality of numeric digits in the received phone number stored in the memory unit to produce the edited phone number.

3. A method according to claim 1 further comprising the step of:

transmitting the edited phone number to place the call to the received phone number.

4. A method according to claim 1 further comprising the step of:

displaying the received phone number.

5. A method according to claim 1 further comprising the step of:

displaying the edited phone number.

6. A method for editing a received phone number within a communication device prior to placing a call to the received phone number, the method comprising the steps of:

receiving a phone number transmitted to the communication device to produce the received phone number having a plurality of numeric digits;

storing the received phone number in a memory unit;

displaying the received phone number;

placing the communication device in an edit mode to permit at least one numeric digit to be inserted at a position preceding the plurality of numeric digits in the received phone number stored in the memory unit to produce an edited phone number;

recalling from the memory unit a predetermined number of numeric digits to be inserted at the position preceding the plurality of numeric digits in the received phone number stored in the memory unit to produce the edited phone number;

determining that at least one of the predetermined number of numeric digits recalled from the memory unit has the same value and has the same position in the edited phone number as at least one of the plurality of numeric digits in the received phone number resulting in an overlap of numeric digits;

deleting the overlap of numeric digits in one of the at least one of the predetermined number of numeric digits and the at least one of the plurality of numeric digits in the received phone number to produce the edited phone number having a desirable number of numeric digits to place the call in the communication system to the received phone number;

displaying the edited phone number; and transmitting the edited phone number to place the call to the received phone number.

7. A method for editing a received phone number within a communication device prior to placing a call to the received phone number, the method comprising the steps of:

receiving a phone number transmitted to the communication device to produce the received phone number having a plurality of numeric digits;

storing the received phone number in a memory unit;

recalling from the memory unit a predetermined number of numeric digits;

inserting the predetermined number of numeric digits at a position preceding the plurality of numeric digits in the received phone number stored in the memory unit to produce an edited phone number;

determining that at least one of the predetermined number of numeric digits recalled from the memory unit has the same value and has the same position in the edited phone number as at least one of the plurality of numeric digits in the received phone number resulting in an overlap of numeric digits; and deleting the overlap of numeric digits in one of the at least one of the predetermined number of numeric digits and the at least one of the plurality of numeric digits in the received phone number to produce the edited phone number having a desirable number of numeric digits to place the call in the communication system to the received phone number.

8. A method according to claim 7 further comprising the step of:

placing the communication device in an edit mode to permit at least one numeric digit to be inserted at the position preceding the plurality of numeric digits in the received phone number stored in the memory unit to produce the edited phone number.

9. A method according to claim 7 further comprising the step of:

transmitting the edited phone number to place the call to the received phone number.

10. A method according to claim 7 further comprising the step of:

displaying the received phone number.

11. A method according to claim 7 further comprising the step of:

displaying the edited phone number.

* * * * *